US009739336B2

(12) United States Patent
Bronowicki (10) Patent No.: US 9,739,336 B2
(45) Date of Patent: Aug. 22, 2017

(54) MAGNETICALLY DAMPED ISOLATOR AND POINTING MOUNT

(71) Applicant: NORTHROP GRUMMAN SYSTEMS CORPORATION, Falls Church, VA (US)

(72) Inventor: Allen J. Bronowicki, Dana Point, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 325 days.

(21) Appl. No.: 14/458,902

(22) Filed: Aug. 13, 2014

(65) Prior Publication Data

US 2016/0047433 A1     Feb. 18, 2016

(51) Int. Cl.
  *F16F 15/03*  (2006.01)
  *B64G 1/22*   (2006.01)
  *F16M 11/40*  (2006.01)
  *F16M 11/20*  (2006.01)

(52) U.S. Cl.
  CPC ............... *F16F 15/03* (2013.01); *B64G 1/22* (2013.01); *F16M 11/2085* (2013.01); *F16M 11/2092* (2013.01); *F16M 11/40* (2013.01); *B64G 2001/228* (2013.01)

(58) Field of Classification Search
  CPC ...... F16F 15/03; B64G 1/22; B64G 2001/228
  See application file for complete search history.

(56) References Cited

U.S. PATENT DOCUMENTS

| 4,595,166 A | * | 6/1986 | Kurokawa | ............... | F16F 15/03 188/267 |
| 4,883,250 A | | 11/1989 | Yano et al. | | |
| 5,086,564 A | * | 2/1992 | Schalz | ............... | B25J 18/02 188/378 |
| 5,285,995 A | | 2/1994 | Gonzalez et al. | | |
| 5,370,352 A | * | 12/1994 | Platus | ............... | F16F 3/026 248/619 |

(Continued)

FOREIGN PATENT DOCUMENTS

CN          102865328 A      1/2013

*Primary Examiner* — Valentina Xavier
*Assistant Examiner* — Steven Hawk
(74) *Attorney, Agent, or Firm* — John A. Miller; Miller IP Group, PLC (57) ABSTRACT

A magnetically damped mounting and isolation system with pointing capability. A payload is mounted to an isolator plate, a base plate is mounted to a satellite or other space vehicle, and the isolation system provides damping of all six degrees of freedom of isolator plate motion relative to the base plate. Three bidirectional magnetic dampers are connected between the isolator plate and the base plate and arranged to provide the required amount of temperature-independent damping. The bidirectional magnetic dampers can be connected to the base plate and the isolator plate in different configurations based on desired mass and natural frequency characteristics. Flexures which statically position the isolator plate are also designed to optimize normal modes of vibration. The isolation system may include a motion amplification feature to increase magnetic damping effectiveness, and the isolation system may also include active positioning of the payload relative to the satellite.

20 Claims, 8 Drawing Sheets

(56) References Cited

U.S. PATENT DOCUMENTS

| | | | | |
|---|---|---|---|---|
| 5,377,950 | A * | 1/1995 | Salcudean | B25J 3/04 248/550 |
| 6,022,005 | A * | 2/2000 | Gran | F16F 15/005 244/164 |
| 6,029,959 | A * | 2/2000 | Gran | F16F 15/005 188/378 |
| 6,454,215 | B1 * | 9/2002 | Pedreiro | B64G 1/283 244/173.1 |
| 7,187,106 | B2 * | 3/2007 | Fuse | G02B 7/003 310/328 |
| 7,248,228 | B2 | 7/2007 | Harless et al. | |
| 7,288,861 | B1 * | 10/2007 | Willard | H02K 41/0356 310/14 |
| 7,424,930 | B2 | 9/2008 | Bizlewicz | |
| 7,950,633 | B2 * | 5/2011 | Hiley | F16F 15/02 188/380 |
| 8,162,299 | B2 * | 4/2012 | Hiley | F16F 15/02 188/380 |
| 8,400,613 | B2 * | 3/2013 | Ishikawa | G02B 7/1827 355/53 |
| 8,578,811 | B2 * | 11/2013 | Alet | B25J 9/0042 74/490.09 |
| 2003/0075401 | A1 * | 4/2003 | Carlson | B62D 5/006 188/267 |
| 2003/0168295 | A1 * | 9/2003 | Han | F16F 15/005 188/267.1 |
| 2004/0212794 | A1 * | 10/2004 | Mizuno | F16F 6/00 355/72 |
| 2006/0033043 | A1 | 2/2006 | Arai | |
| 2006/0272910 | A1 * | 12/2006 | Kraner | F16F 15/027 188/266.7 |
| 2007/0131504 | A1 * | 6/2007 | Bronowicki | F16F 15/035 188/378 |
| 2007/0131830 | A1 * | 6/2007 | Brennan | F16F 15/035 248/206.5 |
| 2007/0144842 | A1 | 6/2007 | Zhou | |
| 2007/0273074 | A1 * | 11/2007 | Mizuno | B60G 17/0157 267/140.15 |
| 2009/0020381 | A1 * | 1/2009 | Hindle | F16F 15/03 188/267 |
| 2009/0224444 | A1 | 9/2009 | Mayama et al. | |
| 2009/0243169 | A1 * | 10/2009 | Hadden | F16F 15/0232 267/122 |
| 2010/0001445 | A1 | 1/2010 | Maruyama et al. | |
| 2012/0267506 | A1 * | 10/2012 | Hadden | F16F 15/06 248/636 |
| 2013/0037689 | A1 * | 2/2013 | Salte | F16F 15/035 248/636 |
| 2013/0299669 | A1 * | 11/2013 | Laurens | F16F 15/08 248/573 |
| 2014/0084113 | A1 * | 3/2014 | Barber | B64G 1/641 244/173.2 |
| 2016/0010717 | A1 * | 1/2016 | Tosovsky | F16F 9/537 188/267.2 |

* cited by examiner

MAGNETICALLY DAMPED ISOLATOR AND POINTING MOUNT

BACKGROUND OF THE INVENTION

Field of the Invention

This invention relates generally to a magnetically damped mounting and isolation device and, more particularly, to a mounting system for a payload aboard a space vehicle which includes three bidirectional magnetic dampers connected between an isolator plate and a base plate and arranged to provide damping of all six degrees of freedom of isolator plate motion relative to the base plate, where the mounting system may include a motion amplification feature to increase magnetic damping effectiveness, and the mounting system may also include active positioning.

Description of the Related Art

Many different types of devices which ride onboard satellites and other space vehicles require specially designed mounting systems. For example, a telescope which rides on a satellite must be mounted so that vibrations from the satellite are not transmitted to the telescope, thus allowing the telescope to focus clearly on its target. For another example, a rotating or reciprocating machine such as a reaction wheel or compressor which rides on a space vehicle must be mounted so that the vibrations from the reaction wheel or compressor are not transmitted back into the space vehicle.

At the same time, the environmental conditions in outer space are extreme, and performance requirements are stringent. Space-based mounting systems must be maintenance-free, must be designed to efficiently utilize mass, must consume little or no energy, and must operate in widely varying temperatures. The temperature range requirement is particularly demanding, and makes it undesirable to use viscoelastic materials or viscous damping in a space-based mounting system. This is because all damping elastomers and fluids, even magneto-rheological (MR) damping fluids, experience changes in viscosity with temperature, and these viscosity changes are significant in the conditions of outer space, where temperatures may range from cryogenic (extreme cold) to moderately hot.

A vibration isolating mounting system is needed which does not need temperature control and can be used in widely varying temperature conditions, which makes effective use of mass, and which requires no energy input to provide the required damping.

SUMMARY OF THE INVENTION

In accordance with the teachings of the present invention, a magnetically damped mounting and isolation system is disclosed. A payload is mounted to an isolator plate, a base plate is mounted to a satellite or other space vehicle, and the isolation system provides damping of all six degrees of freedom of isolator plate motion relative to the base plate. Three bidirectional magnetic dampers are connected between the isolator plate and the base plate and arranged to provide the required amount of temperature-independent damping. The bidirectional magnetic dampers can be connected to the base plate and the isolator plate in different configurations based on desired mass and natural frequency characteristics. Flexures which statically position the isolator plate are also designed to optimize normal modes of vibration. The isolation system may include a motion amplification feature to increase magnetic damping effectiveness, and the isolation system may also include active positioning of the payload relative to the satellite.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a magnetically damped mounting and isolation system is merely exemplary in nature, and is in no way intended to limit the invention or its applications or uses.

Many devices which are carried onboard satellites and other space vehicles require a mounting system which provides vibration isolation and damping. This includes devices which must be isolated from vibrations of the space vehicle, and devices which themselves create vibrations from which the space vehicle must be isolated. Due to the environmental conditions experienced in outer space—including temperatures which may range from cryogenic to moderately hot—viscous dampers do not provide adequate results, as their damping performance varies with temperature. Purely magnetic damping, which is not sensitive to temperature variations, is ideally suited to application in outer space. Mounting and isolation systems are disclosed herein which use bidirectional magnetic dampers and other components arranged to provide damping in all six degrees of freedom of motion of a payload relative to the host vehicle onboard which it is riding.

Figure 1:
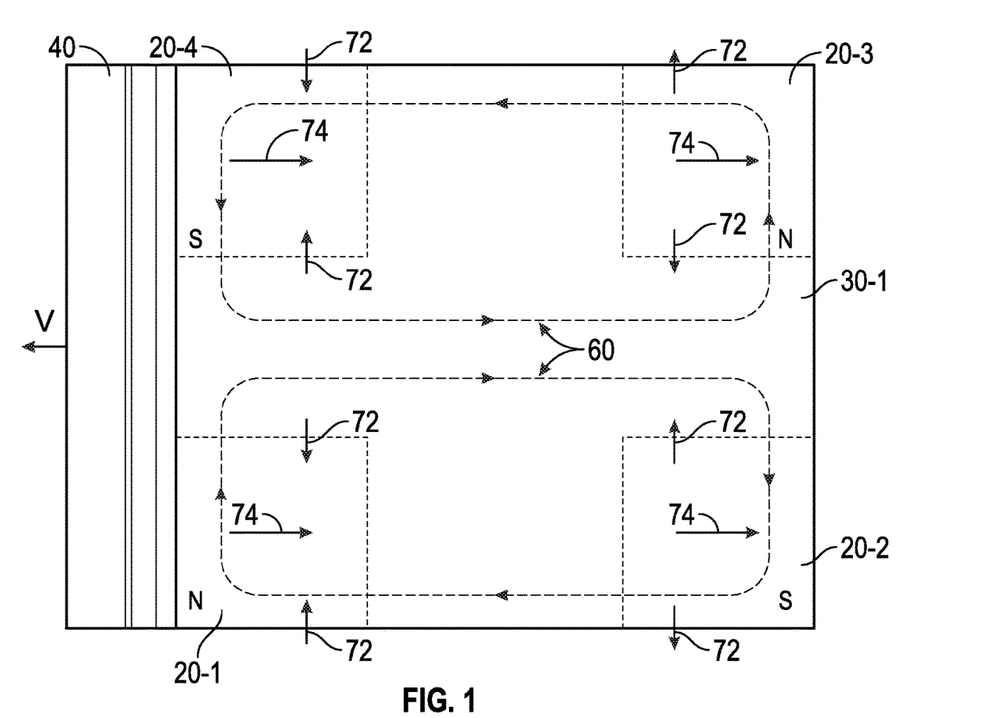
FIG. 1 is a first schematic diagram of a bidirectional magnetic damper showing an electrical field created by motion of a conductor plate relative to magnets and back iron plates.
Figure 2:
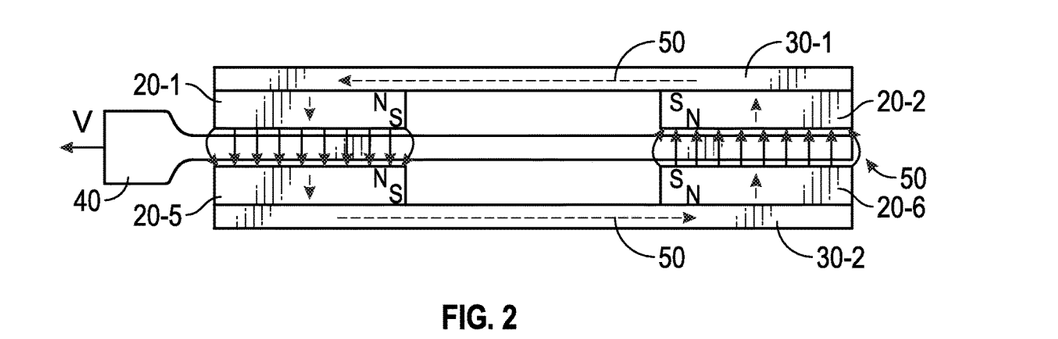
FIG. 2 is a second schematic diagram of the bidirectional magnetic damper showing magnetic flux lines created by the permanent magnets and back iron plates, and their interaction with the conductor plate.

FIG. 1 is a first view and FIG. 2 is a second view illustration of a bidirectional magnetic damper 10 shown in schematic form. FIGS. 1 and 2 show the key elements of the bidirectional magnetic damper 10 and how they interact to provide purely magnetic damping. It will later be shown how the bidirectional magnetic damper 10 can be used in a magnetically damped mounting and isolation system.

The bidirectional magnetic damper 10 includes a plurality of permanent magnets 20. In the preferred embodiment shown, there are eight of the permanent magnets 20, individually referred to as 20-1 through 20-8. The permanent magnets 20 preferably have very strong magnetic fields. In one embodiment, the permanent magnets 20 are made from an alloy of neodymium, iron and boron, or other "rare earth" compositions. The permanent magnets 20 are attached to a pair of back iron plates 30. The permanent magnets 20-1 through 20-4 are attached to outer corners of the back iron plate 30-1, and the permanent magnets 20-5 through 20-8 are attached to outer corners of the back iron plate 30-2. The magnets 20 are arranged on their respective back iron plate 30 with alternating polarities, such that the magnets 20-1 and 20-3 have one polarity orientation (such as North facing "up"—or out of the page—in FIG. 1), and the magnets 20-2 and 20-4 have the opposite polarity orientation (South "up" in FIG. 1). Such polarity orientations are required in order to set up the magnetic flux loops discussed below.

The back iron plates 30 are constructed of a magnetically permeable material such as iron or a magnetic alloy of iron. The permanent magnets 20 are attached to the back iron plates 30 in any suitable fashion, including gluing, mechanical fastener, or simply via the inherent magnetic attraction. In a preferred embodiment, a small feature is stamped or machined into the back iron plates 30 to ensure the proper positioning of the permanent magnets 20 in their respective corners, the permanent magnets 20 are placed in position where they stick due to magnetic force, and no adhesive or mechanical fastener is used. The back iron plates 30 do not move relative to each other; they must be rigidly attached to each other, or rigidly attached to a common mounting structure.

The bidirectional magnetic damper 10 also includes a conductor plate 40, which is positioned in the gap between the permanent magnets 20. The conductor plate 40 is constructed of a highly electrically conductive, but not magnetically permeable, material—such as copper or a copper alloy. In one embodiment, the conductor plate 40 is constructed of a beryllium copper compound. The conductor plate 40 must be held in position in the air gap between the permanent magnets 20 by an external device (not shown in FIGS. 1-2; discussed further below). That is, in FIG. 1, the conductor plate 40 can move up/down or left/right, but in FIG. 2, the conductor plate 40 cannot move up/down to contact the permanent magnets 20. As will be explained further below, damping forces (forces opposing the direction of motion) are created in the bidirectional magnetic damper 10 when the conductor plate 40 moves (either up/down or left/right in FIG. 1—which may be referred to as the "in-plane" directions) relative to the back iron plates 30 and the permanent magnets 20.

In FIG. 2, magnetic flux lines 50 are shown. The magnetic flux lines 50 are static, as they are produced by the permanent magnets 20 and carried through the back iron plates 30. As seen in FIG. 2, a counter-clockwise loop is formed by the magnetic flux lines 50, from the permanent magnet 20-1 across the air gap and through the conductor plate 40 to the permanent magnet 20-5, through the back iron plate 30-2 and to the permanent magnet 20-6, across the air gap and through the conductor plate 40 to the permanent magnet 20-2, and through the back iron plate 30-1 back to the permanent magnet 20-1. Similar flux loops could be seen when viewing the bidirectional magnetic damper 10 from other edge-wise orientations, where each of the flux loops involve four of the permanent magnets 20 (two on each of the back iron plates 30).

When the conductor plate 40 moves relative to the back iron plates 30, eddy current loops 60 are formed in the conductor plate 40. Faraday's law of induction defines the electric potential produced as a function of the of the time rate of change of the magnetic flux through a circuit (which is dependent on a velocity V of the conductor plate 40 relative to the back iron plates 30), where the circuit can be any portion of the conductor plate 40 affected by the flux loops discussed above. Ohm's law defines the eddy current as a function of the electric potential (thus the velocity V) and the resistance of the conductor plate 40. Finally, Lorentz' law defines a force produced by the eddy current, as a function of the current (thus the velocity V) and the magnetic field strength.

The current loops 60 produce a number of forces in the conductor plate 40, according to Lorentz' law. Force vectors 72, which are transverse to the relative velocity V, cancel each other out. However, force vectors 74 yield a net force on the conductor plate 40 which is opposite the direction of the relative velocity V. Thus, the force vectors 74 represent a damping force which is effective against in-plane motion of the conductor plate 40 relative to the back iron plates 30. The bidirectional magnetic damper 10 can either be configured such that the conductor plate 40 is fixed to a base structure and the back iron plates 30 are attached to an isolator plate (which carries a payload), or vice versa.

The 2×2 symmetrical arrangement of the permanent magnets 20 on each of the back iron plates 30 ensures that eddy current damping is the same for motions in both in-plane directions (either up/down or left/right in FIG. 1) of the conductor plate 40 relative to the back iron plates 30 and the permanent magnets 20. The back iron plates 30, the permanent magnets 20 and the conductor plate 40 are preferably all rectangular in shape, and may be square (other than any mounting features on the back iron plates 30 or the conductor plate 40).

Figure 3:
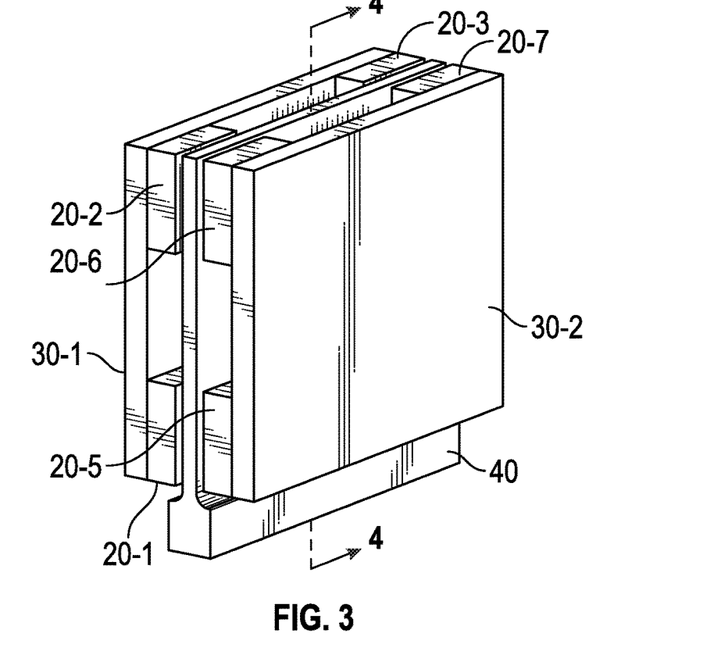
FIG. 3 is an isometric view illustration of a bidirectional magnetic damper which can be used as a component in a mounting and isolation system.
Figure 4:
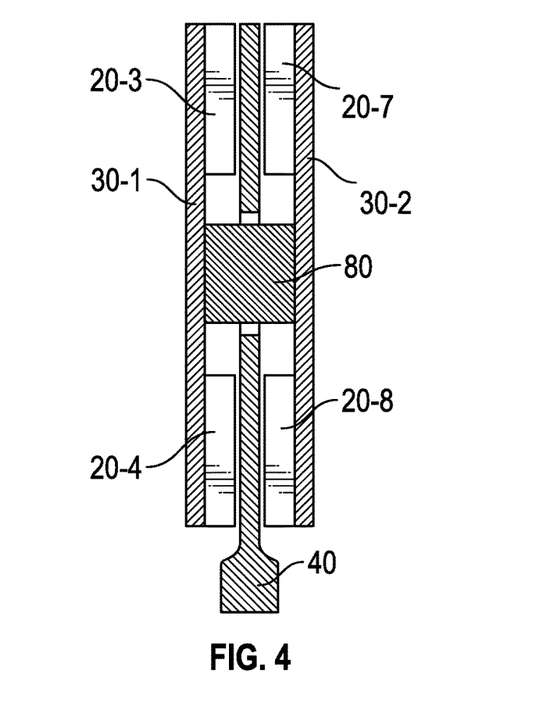
FIG. 4 is a cross-sectional view illustration of the bidirectional magnetic damper of FIG. 3, showing how the back iron plates can be interconnected.

FIG. 3 is an isometric view illustration of the bidirectional magnetic damper 10, where the components discussed above can be further visualized. FIG. 4 is a cross-sectional illustration of the bidirectional magnetic damper 10, as indicated by the section line 4 of FIG. 3. It was mentioned previously that the back iron plates 30-1 and 30-2 must not be allowed to move relative to each other. A coupler 80 can be used to fix the two back iron plates 30 together. The coupler 80 should be constructed of a material with low magnetic permeability, so as not to disrupt the magnetic flux lines 50. The coupler 80 may preferably be constructed of stainless steel, which has a low magnetic permeability, but has a coefficient of thermal expansion similar to the back iron plates 30. The coupler 80 can be affixed to the back iron plates 30 by mechanical fastener, welding, bonding, etc. The coupler 80 may be a round cylindrical shape which passes through an oversize round hole in the conductor plate 40, thus allowing the conductor plate 40 to move a certain distance relative to the back iron plates 30. A rubber grommet (not shown) may be placed between the outside of the coupler 80 and the inside of the hole in the conductor plate 40, where the grommet acts as a "snubber" to limit the displacement of the conductor plate 40 relative to the back iron plates 30. The coupler 80 could have other configurations, such as C-shaped brackets which reach around and attach to outer faces of the back iron plates 30, and thereby do not require a hole in the conductor plate 40.

The bidirectional magnetic dampers 10 embody many desirable features. As discussed earlier, they provide purely magnetic damping which is temperature-independent. They can be designed to provide equal damping in both in-plane directions. Furthermore, the bidirectional magnetic dampers 10 are entirely passive devices, requiring no power supply and consuming no energy. In addition, the bidirectional magnetic dampers 10 have no parts which rub against each other; thus, there are no parts to wear out, there is no opportunity for performance degradation over time, and no source of dust or debris created by part-to-part friction.

FIGS. 1-4 and the accompanying discussion in the preceding paragraphs describe how the bidirectional magnetic damper 10 is constructed, and how it provides a damping force opposing motion of the conductor plate 40 relative to the back iron plates 30 and the permanent magnets 20 in either of the two orthogonal in-plane directions. In the following discussion, magnetically damped mounting and isolation systems will be disclosed which employ three of the bidirectional magnetic dampers 10 in an assembly for isolating a payload relative to a base structure or vehicle.

Figure 5:
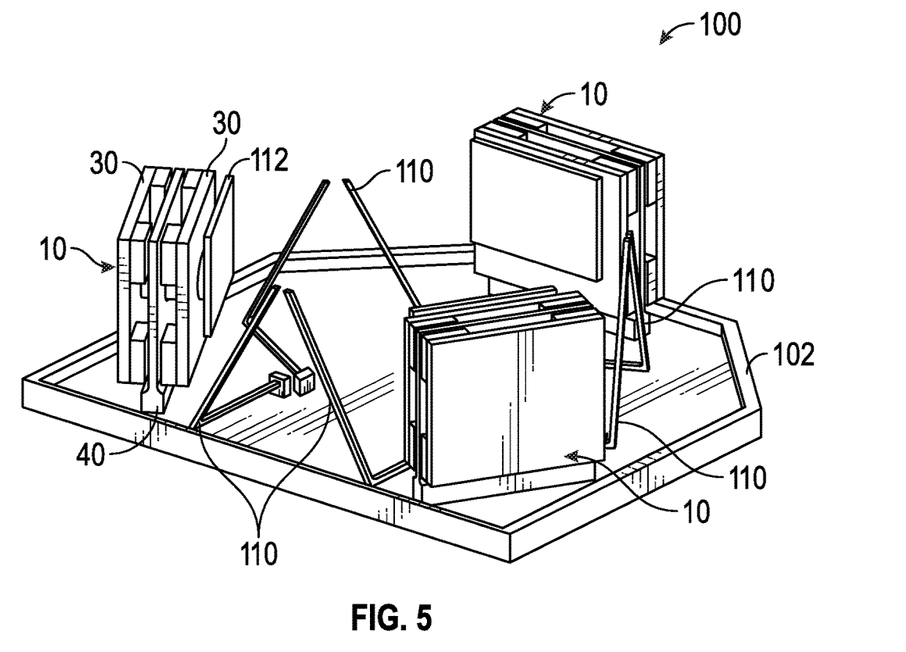
FIG. 5 is an isometric view illustration of a first embodiment (partial) of a magnetically damped mounting and isolation system for isolating a payload relative to a base structure or vehicle.
Figure 6:
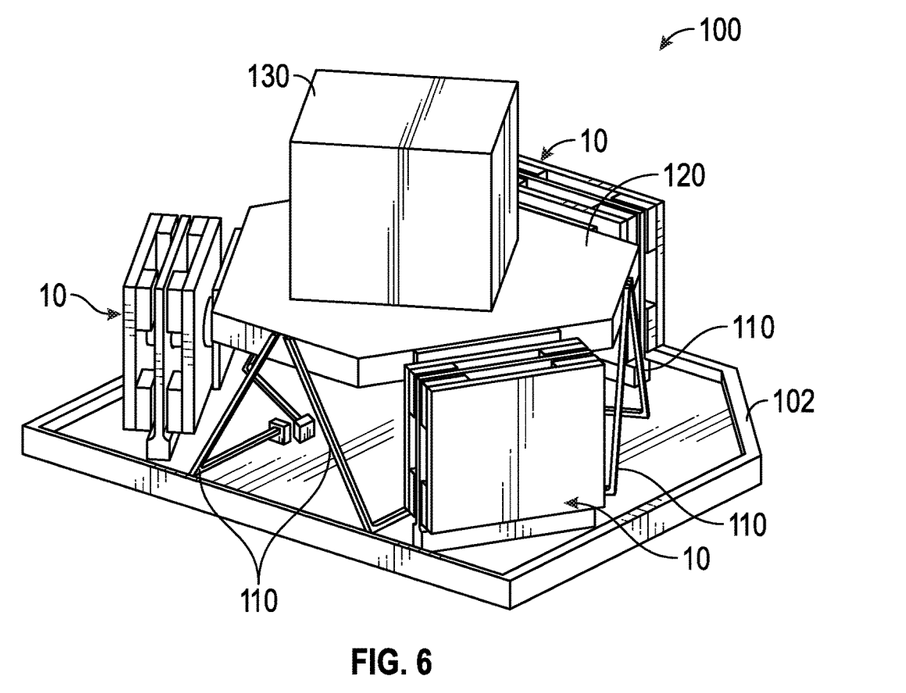
FIG. 6 is an isometric view illustration of the first embodiment (complete) of the magnetically damped mounting and isolation system for isolating a payload relative to a base structure or vehicle.

FIGS. 5 and 6 are isometric view illustrations of a first embodiment of a magnetically damped mounting and isolation system 100 for isolating a payload relative to a base structure or vehicle. In FIG. 5, some components of the isolation system 100 have been omitted for better visualization of other components. The isolation system 100 includes three of the bidirectional magnetic dampers 10, arranged at 120° position intervals around a payload to provide the required damping. The three bidirectional magnetic dampers 10 are mounted to a base plate 102 such that the conductor plates 40 are attached to the base plate 102 and the back iron plates 30 are free-floating (that is, they move with the payload, per the following figures and discussion).

A plurality of L-shaped flexures 110 have an end of one leg attached to the base plate 102 and an opposite end of the other leg attached to an isolator plate 120, as shown in FIG. 5. The flexures 110 are attached to both the base plate 102 and the isolator plate 120 in a cantilever fashion, where the cantilever attachment to the base plate 102 is elevated in order to provide clearance for bending of the flexures 110. The flexures 110 serve as springs which provide static positioning of the isolator plate 120 and payload relative to the base plate 102. In the isolation system 100, six of the flexures 110 are used, arranged in pairs as shown. The flexures 110 are preferably constructed of a high strength material such as titanium, which can be made very thin in order to minimize weight. For outer space applications, the stiffness of the flexures 110 can be designed purely to meet natural frequency characteristics of the payload, as there is no static payload weight to carry in a zero-gravity environment. The position and orientation (tilt angle) of the flexures 110 can be optimized so that the center of force (in a side view) is at the same height as the center of mass of the payload. This optimization minimizes pitch modes of the payload relative to the base plate 102.

Each of the bidirectional magnetic dampers 10 includes a damper mount 112 attached to the innermost of the back iron plates 30. The damper mounts 112 are also attached to the isolator plate 120 which carries the payload, as discussed below. The damper mounts 112 may preferably be constructed of aluminum, so as not to affect the magnetic field in the back iron plates 30 while also providing structural rigidity and light weight. It would also be possible to attach the innermost of the back iron plates 30 directly to the isolator plate 120, without the use of the damper mounts 112.

In FIG. 6, the isolator plate 120 has been added, attached to the flexures 110 and the damper mounts 112. The isolator plate 120 may also be constructed of aluminum or a composite material, for high stiffness and low mass. As discussed above, the flexures 110 provide spring-force suspension of the isolator plate 120 relative to the base plate 102. At the same time, because the isolator plate 120 is connected to the back iron plates 30 via the damper mounts 112, motion of the isolator plate 120 causes the back iron plates 30 and the permanent magnets 20 to move relative to the conductor plates 40, which are fixed to the base plate 102. Thus, the bidirectional magnetic dampers 10 provide damping of motion of the isolator plate 120 relative to the base plate 102.

Also added in FIG. 6, on top of the isolator plate 120, is a payload 130. The payload 130 represents the device which is to be isolated from the base structure, as discussed previously. The payload 130 is shown as a simple cube in the figures; in reality, the payload 130 could be a telescope, a reaction wheel or compressor, or almost any other device which needs to be isolated from the base vehicle. As a result of the unique positioning and connectivity of the three bidirectional magnetic dampers 10, the isolation system 100 provides damping in all six degrees of freedom of motion (three orthogonal translations and three orthogonal rotations) of the isolator plate 120 and the payload 130 relative to the base plate 102.

Figure 7:
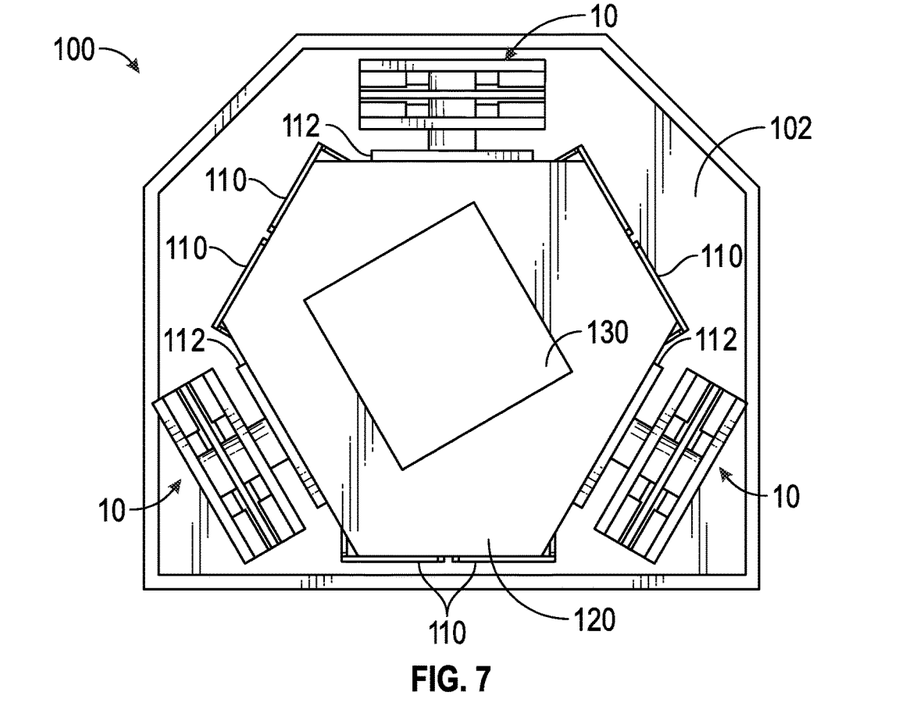
FIG. 7 is a top view illustration of the first embodiment of the magnetically damped mounting and isolation system.
Figure 8:
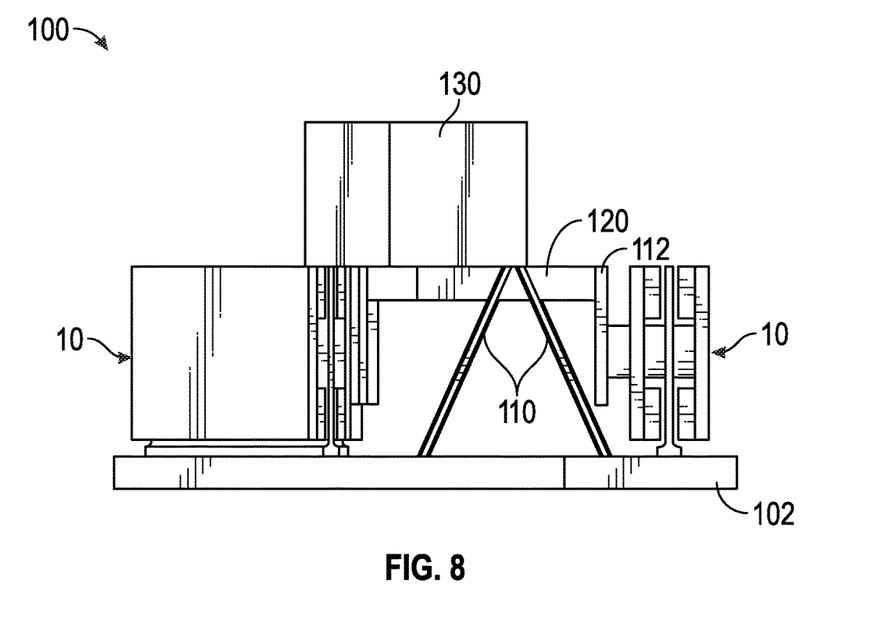
FIG. 8 is a side view illustration of the first embodiment of the magnetically damped mounting and isolation system.

FIGS. 7 and 8 are a top view illustration and a side view illustration, respectively, of the magnetically damped mounting and isolation system 100, where the arrangement of the components discussed above can be seen in alternate views. It can be seen in FIGS. 5-8 and the accompanying discussion that the isolation system 100 provides springing and temperature-independent damping for any device needing mounting and isolation, and is ideally suited to the zero-gravity environment and temperature extremes of outer space.

Figure 9:
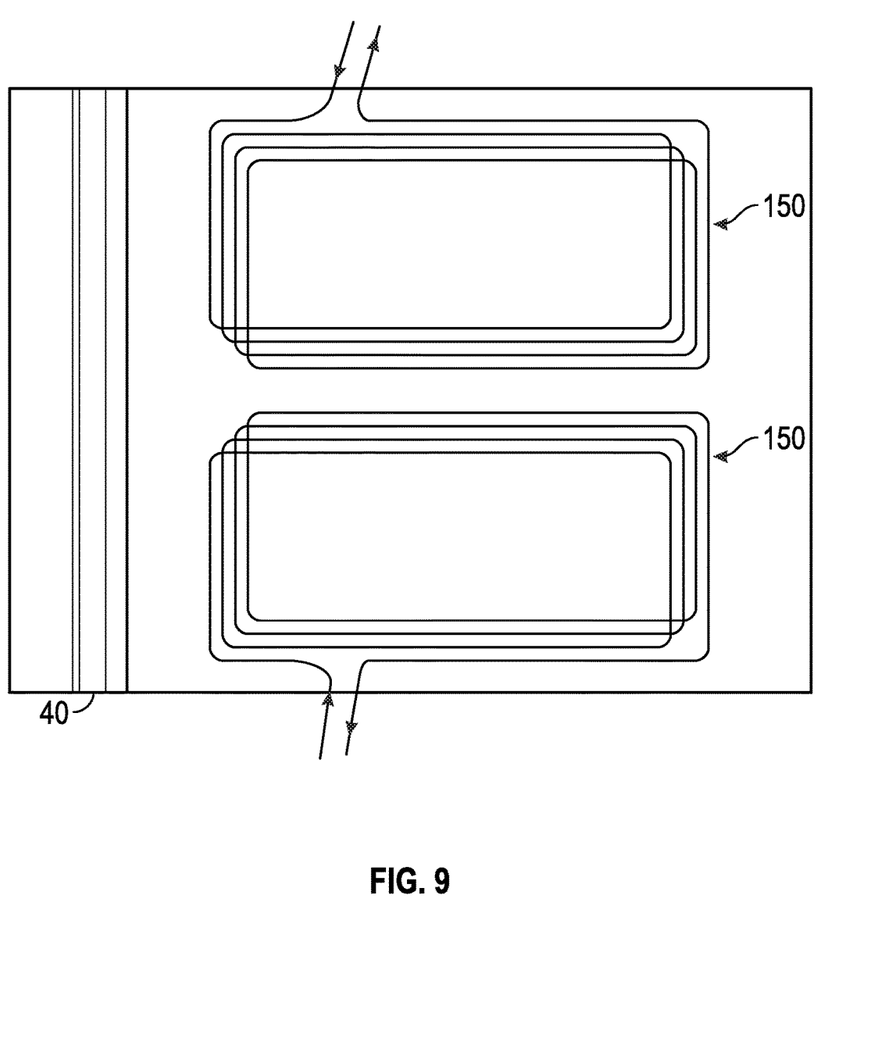
FIG. 9 is an illustration of a conductor plate with coils added to provide an actuation feature in the bidirectional magnetic damper.

It is also possible to add coils to the conductor plates 40, where the coils would be arranged similarly to the current loops 60. FIG. 9 is an illustration of the conductor plate 40 with coils 150 added. The coils 150, which are preferably copper wire, are laid out in a flat configuration, where each successive loop of the coil 150 is not stacked on top of the previous loops. In this way, the coils 150 add very little thickness, thus allowing the conductor plate 40 and the coils 150 to fit in the air gap between the permanent magnets 20.

By selectively passing current through the coils 150, the bidirectional magnetic dampers 10 can be made to function as actuators or positioning devices, and thus the isolation system 100 can also serve as a pointing mount. This may be especially useful when the payload 130 is a telescope which requires fine aiming adjustment relative to its host vehicle, for example. When the bidirectional magnetic dampers 10 are used as actuation devices, they also still function as passive magnetic dampers. In some applications, it may only be necessary to provide actuation in one of the in-plane directions—such as the vertical direction of FIGS. 3-6, which would enable tipping/tilting control of the payload 130. If actuation in both in-plane directions of the bidirectional magnetic dampers 10 is required, then the coils 150 could be added to both sides of the conductor plate 40—with the coil loops on one side of the conductor plate 40 being elongated in one direction, and the loops on the opposite side of the conductor plate 40 being elongated in the other (transverse) in-plane direction.

In the isolation system 100 discussed above, the back iron plates 30 and the permanent magnets 20 may be referred to as "sprung mass"—that is, they are supported relative to the base plate 102 by the flexures 110, and they move with the isolator plate 120. This configuration may be advantageous in applications in which it is desired to lower the natural frequency of vibration of the payload 130, where the reduction in natural frequency is accomplished via the additional moving mass of the relatively heavy back iron plates 30 and the permanent magnets 20.

Figure 10:
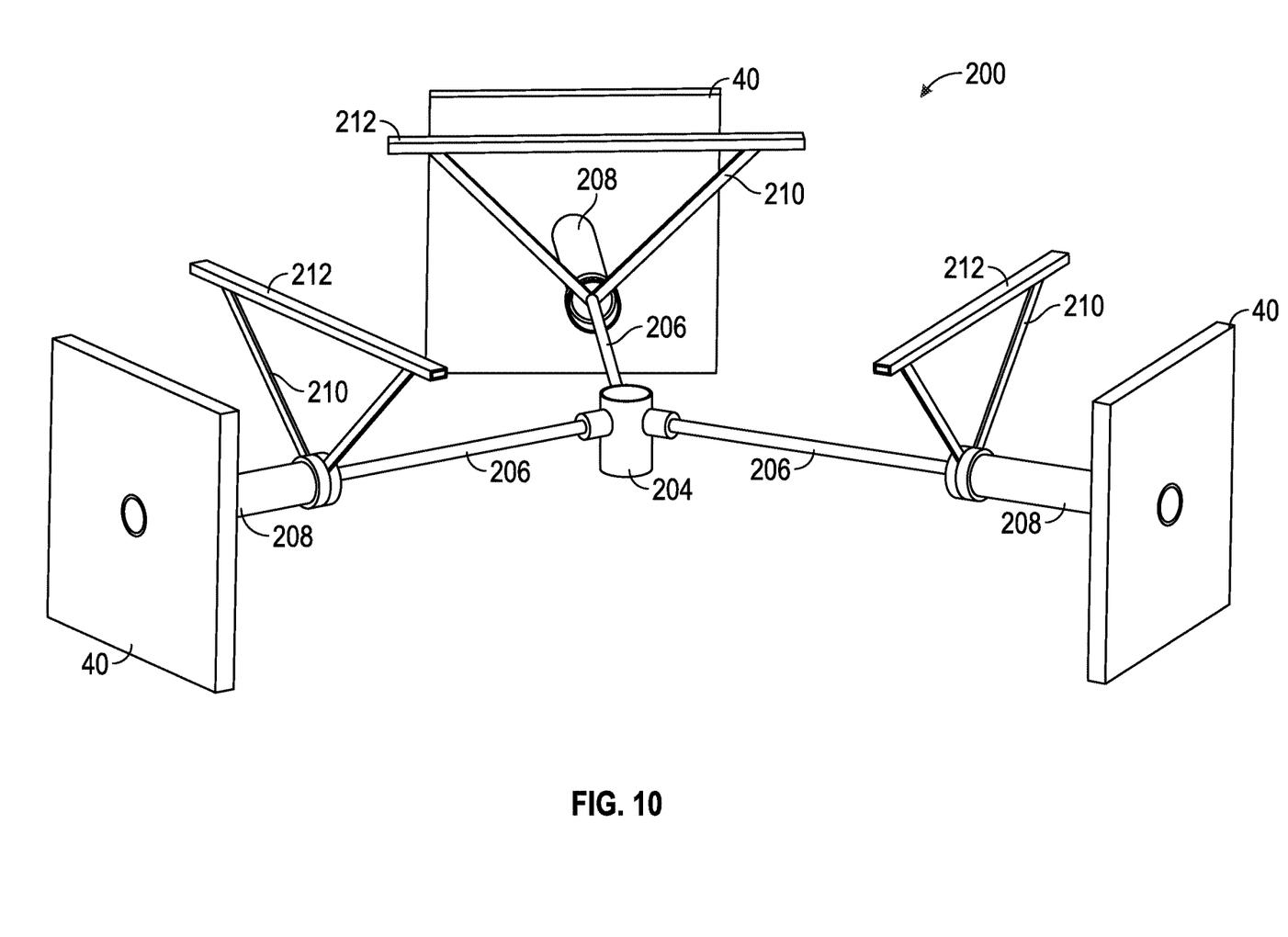
FIG. 10 is an illustration of a second embodiment (partial) of a magnetically damped mounting and isolation system which includes a motion amplification feature.
Figure 11:
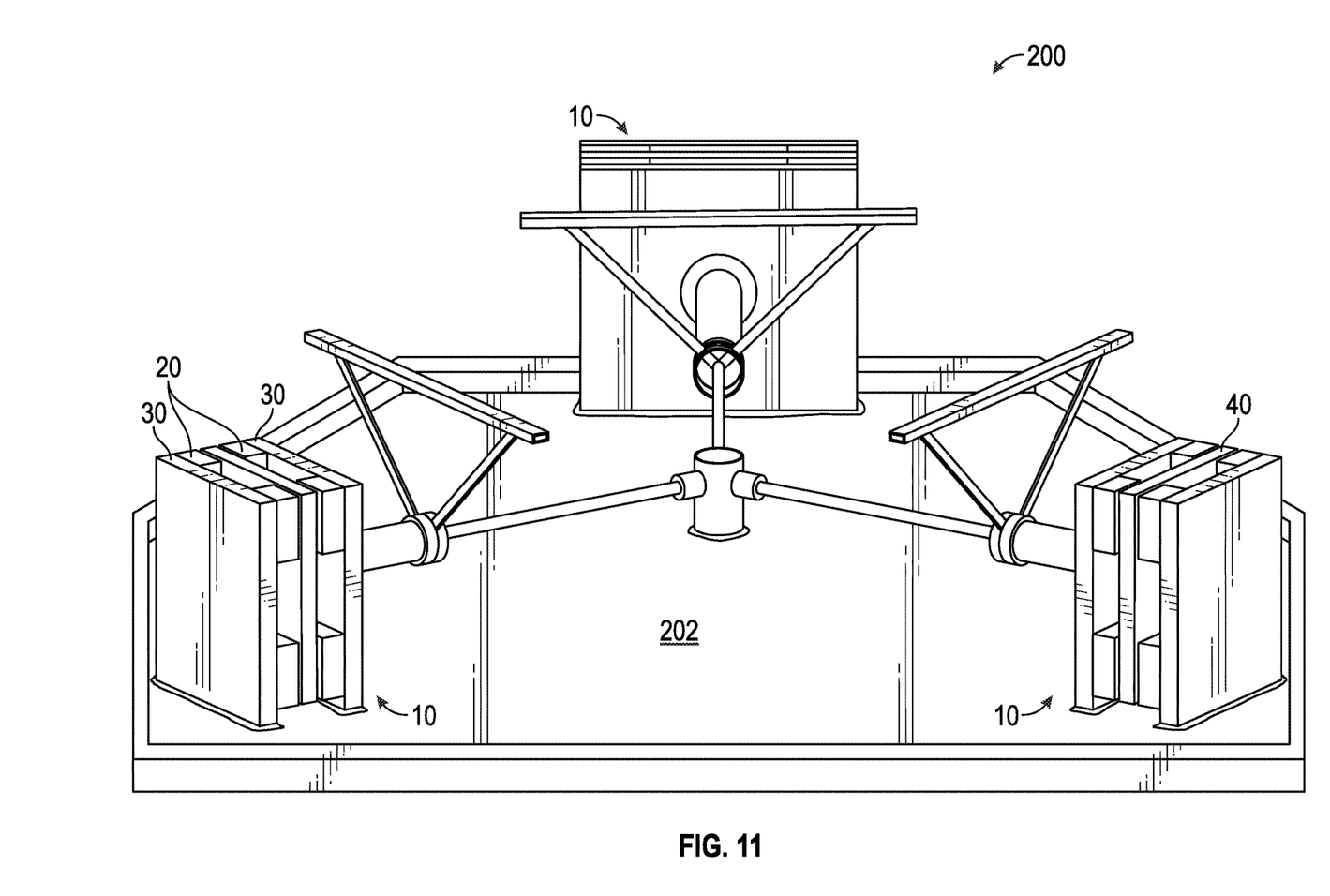
FIG. 11 is an illustration of the second embodiment (partial) of the magnetically damped mounting and isolation system with motion amplification.
Figure 12:
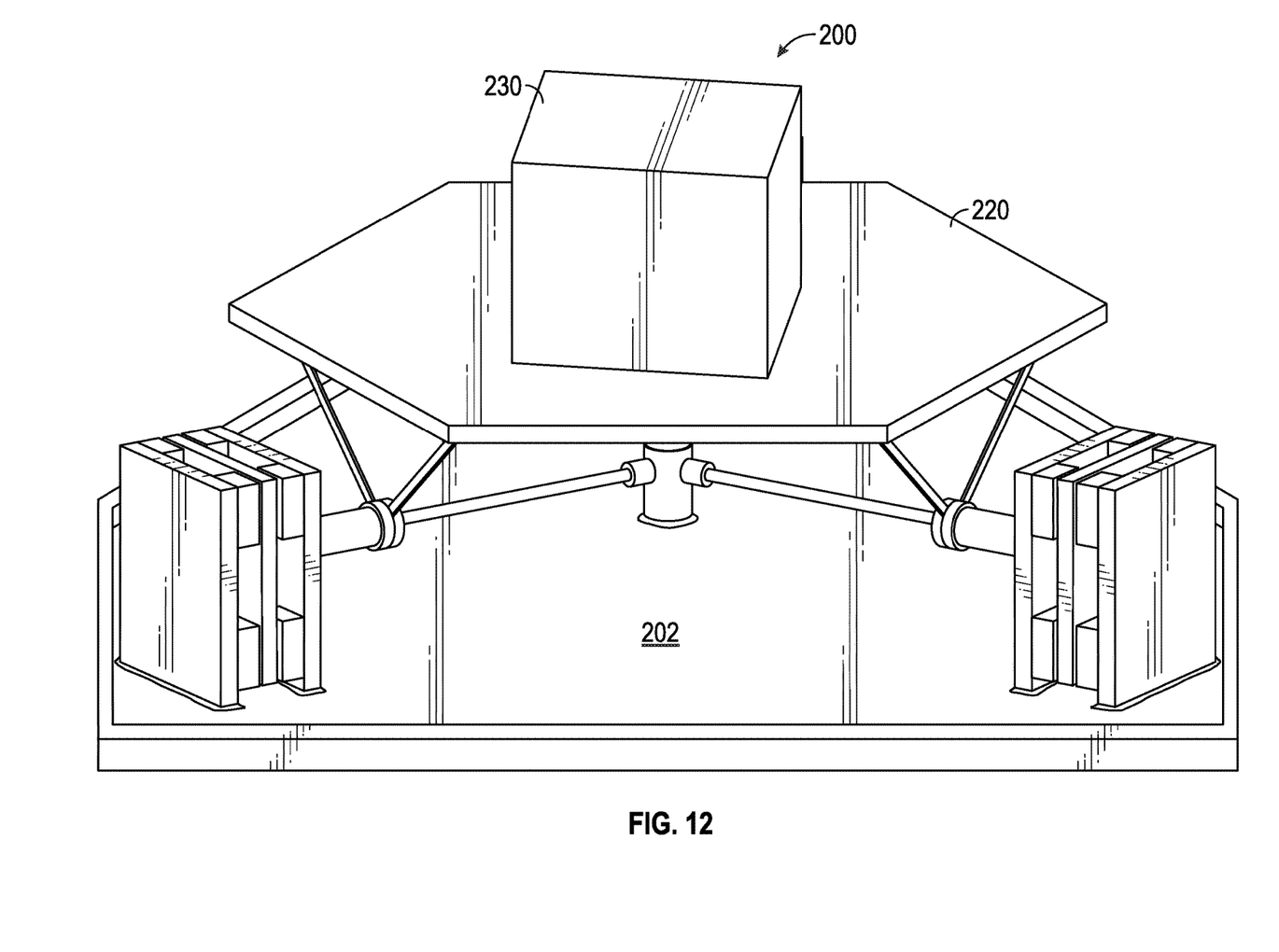
FIG. 12 is an illustration of the second embodiment (complete) of the magnetically damped mounting and isolation system with motion amplification.

In other space vehicle applications, it is desirable to minimize mass. Because the permanent magnets 20 and the back iron plates 30 are inherently dense, it would be advantageous to minimize their size while still achieving the required level of damping. One way to do this is to amplify the motion experienced by the bidirectional magnetic dampers 10 for a given motion of the payload 130. FIGS. 10-12 are progressively-constructed illustrations of a magnetically damped mounting and isolation system 200 which embodies this motion amplification concept.

In the motion amplification isolation system 200, three of the bidirectional magnetic dampers 10 are again used. However, instead of attaching the bidirectional magnetic dampers 10 directly to the isolator plate 120 as before, a different connectivity is employed to provide motion amplification.

Referring first to FIG. 10, a hub 204 is mounted to a base plate 202 (base plate 202 shown in later figures). The hub 204 serves as a rigid central connection for three isolator bending beams 206, which extend out from the hub 204 at 120° position intervals. The isolator bending beams 206 have a slender rod shape, and are designed to be flexible enough to bend under dynamic loading of the payload. The isolator bending beams 206 transition into strut extensions 208, which have much higher bending stiffness than the isolator bending beams 206. Each of the strut extensions 208 attaches to the conductor plate 40 of one of the bidirectional magnetic dampers 10. The strut extensions 208 pass through holes in the innermost of the back iron plates 30 (shown in later figures), thus allowing for motion of the strut extensions 208 and the conductor plates 40 relative to the back iron plates 30.

At the juncture between the isolator bending beams 206 and the strut extensions 208, V-flexures 210 are attached which extend upward to brackets 212. The V-flexures 210 and the brackets 212 transmit force perpendicular to the isolator bending beams 206, but do not appreciably transmit other forces or bending moments.

In FIG. 11, the bidirectional magnetic dampers 10 are shown in completed form, including the permanent magnets 20 and the back iron plates 30. In the isolation system 200, the back iron plates 30 are fixed to the base plate 202 while, as described above, the conductor plates 40 move as the payload moves. An isolator plate 220 (with payload 230 atop, as shown in FIG. 12) is attached to the three brackets 212.

To understand the motion amplification feature, consider a dynamic loading on the payload 230 which causes a vertical ("bounce") motion of the payload 230 relative to the base plate 202. It can be seen that the outer tips of the isolator bending beams 206 will displace vertically by the same amount as the payload 230, but the outer tips of the strut extensions 208 will displace vertically by a greater amount. The motion amplification at the outer tips of the strut extensions 208 (and therefore the conductor plates 40) is due to both the vertical translation and the bending rotation of the tips of the isolator bending beams 206, projected outward to the tips of the strut extensions 208. The same motion amplification concept applies to other degree of freedom of motion.

Thus, the conductor plates 40 experience a velocity relative to the back iron plates 30 which is greater than the velocity of the payload 230 relative to the base plate 202, in any direction of motion. This increased velocity at the bidirectional magnetic dampers 10, or motion amplification, generates a greater damping force for a given size of the permanent magnets 20 and the back iron plates 30 than would be achieved without motion amplification. The damping is increased by the square of the amplification, thus enabling a significant reduction in mass of the permanent magnets 20 and the back iron plates 30.

As discussed previously, coils could be added to the conductor plates 40 to convert the bidirectional magnetic dampers 10 into actuator devices. This option may also be employed in the motion amplification isolation system 200 to produce a mounting and isolation system with pointing capability.

Using the devices described above, purely magnetic, temperature-independent damping can be employed in a mounting and isolation system. The bidirectional magnetic dampers 10, which consume no energy and have no parts experiencing friction or wear, serve as the foundation for isolation systems which provide damping in all six degrees of freedom of motion of a payload relative to a base. The isolation systems feature spring rates and directions, mass distribution and damping coefficients which can all be tuned to optimize the dynamic response of the payload. A motion amplification design can be employed to minimize the mass of the isolation system while still providing the required amount of damping. The bidirectional magnetic dampers 10 can also be enhanced to include actuation, which enables the creation of a mounting and isolation system with a pointing feature. The resulting isolation systems are ideal for use in space vehicles and other applications.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for mounting and isolating a payload onboard a host platform, said system comprising:
  a base plate mounted to the host platform;
  an isolator plate on which the payload is affixed;
  a plurality of flexures attached to both the base plate and the isolator plate, wherein said flexures support the isolator plate at a distance from the base plate; and
  three bidirectional magnetic dampers connected between the isolator plate and the base plate which collectively provide magnetic damping of all six degrees of freedom of motion of the isolator plate with respect to the base plate.

2. The system of claim 1 wherein each of the bidirectional magnetic dampers includes:
  two back iron plates of identical rectangular shape, where the back iron plates are composed of a material with a high magnetic permeability, and where the back iron plates are arranged parallel to each other to define inner faces and outer faces;

a plurality of permanent magnets, where half of the magnets are attached to the inner face of each of the back iron plates, and where a fixed air gap exists between the magnets on one back iron plate and the magnets on the other back iron plate; and a conductor plate of a size generally equivalent to the back iron plates, where the conductor plate is oriented parallel to the back iron plates and positioned in the air gap between the magnets, and where the conductor plate is composed of a material with a high electrical conductivity and a low magnetic permeability, whereby an in-plane movement of the conductor plate relative to the back iron plates produces a force on the conductor plate which is a function of and in an opposite direction to a velocity of the movement.

3. The system of claim 2 wherein the plurality of permanent magnets is eight magnets in an arrangement with one of the magnets positioned at each corner of the inner faces of each of the back iron plates.

4. The system of claim 2 wherein the permanent magnets are composed of a neodymium-iron-boron alloy, the back iron plates are composed of iron or a magnetic alloy thereof, and the conductor plate is composed of a copper alloy.

5. The system of claim 2 further comprising electrical coils affixed to at least one face of the conductor plate, where electrical current can be supplied to the coils to produce a translational force on the conductor plate relative to the back iron plates, whereby the bidirectional magnetic dampers can supply an actuation force and the system can actively position the payload relative to the host platform.

6. The system of claim 1 wherein the flexures and the bidirectional magnetic dampers are arranged such that a motion of the payload produces an amplified motion within the bidirectional magnetic dampers, thereby increasing damping effectiveness of the bidirectional magnetic dampers.

7. A system for mounting and isolating a payload onboard a host platform, said system comprising:

a base plate mounted to the host platform;

an isolator plate on which the payload is affixed;

a plurality of spring flexures attached to both the base plate and the isolator plate, where the spring flexures support the isolator plate in a position generally parallel to the base plate and at a prescribed distance from the base plate; and three bidirectional magnetic dampers positioned at equal 120° intervals around a periphery of the isolator plate and attached to both the base plate and the isolator plate, where the bidirectional magnetic dampers collectively provide magnetic damping of all six degrees of freedom of motion of the isolator plate with respect to the base plate.

8. The system of claim 7 wherein each of the bidirectional magnetic dampers includes:

two back iron plates of identical rectangular shape, where the back iron plates are composed of a material with a high magnetic permeability, and where the back iron plates are arranged parallel to each other to define inner faces and outer faces;

a coupling device rigidly attached between the two back iron plates and holding the back iron plates in alignment with and parallel to each other at a fixed distance between the inner faces, where the coupling device is composed of a material with a low magnetic permeability;

eight permanent magnets, where four of the magnets are attached to the inner face of each of the back iron plates in an arrangement with one of the magnets positioned at each corner of each of the back iron plates, and where a fixed air gap exists between the magnets on one back iron plate and the magnets on the other back iron plate; and a conductor plate of a size generally equivalent to the back iron plates, where the conductor plate is oriented parallel to the back iron plates and positioned in the air gap between the magnets, and where the conductor plate is composed of a material with a high electrical conductivity and a low magnetic permeability, whereby an in-plane movement of the conductor plate relative to the back iron plates produces a force on the conductor plate which is a function of and in an opposite direction to a velocity of the movement.

9. The system of claim 8 wherein the conductor plate of each of the bidirectional magnetic dampers is fixed to the base plate, and one of the back iron plates of each of the bidirectional magnetic dampers is coupled to the isolator plate, the coupling device has a cylindrical shape and is positioned centrally on the inner faces of the back iron plates, and the conductor plate has a central hole larger than a diameter of the coupling device and through which the coupling device passes.

10. The system of claim 8 further comprising electrical coils affixed to at least one face of the conductor plate, where electrical current can be supplied to the coils to produce a translational force on the conductor plate relative to the back iron plates, whereby the bidirectional magnetic dampers can supply an actuation force and the system can actively position the payload relative to the host platform.

11. The system of claim 8 wherein the permanent magnets are composed of a neodymium-iron-boron alloy, the back iron plates are composed of iron or a magnetic alloy thereof, the coupling device is composed of stainless steel, and the conductor plate is composed of a copper alloy.

12. The system of claim 7 wherein the plurality of spring flexures is six L-shaped flexures, where one leg of each L-shaped flexure is fixed to the base plate and the other leg of each L-shaped flexure extends out of plane of the base plate and attaches at a distal end to the isolator plate, and where the six L-shaped flexures are positioned in pairs at three equally-spaced locations around the isolator plate, and a position and orientation of the six L-shaped flexures are designed to place a center of force of the six L-shaped flexures at a distance from the base plate which is equal to a distance from the base plate to a center of mass of the payload.

13. The system of claim 7 wherein the host platform is a space vehicle operating in a zero-gravity environment.

14. A motion-amplifying system for mounting and isolating a payload onboard a host platform, said system comprising:

a base plate mounted to the host platform;

an isolator plate on which the payload is affixed;

a central hub fixed to the base plate;

three bending beams having a slender rod shape, where the bending beams are positioned at equal 120° intervals around the central hub, and where the bending beams are fixed at an inner end to the central hub and extend perpendicularly away from the central hub and parallel to the base plate;

three strut extensions having a cylindrical shape and greater bending stiffness than the bending beams, where each of the strut extensions is co-aligned with one of the bending beams, and an inner end of each of the strut extensions is attached to an outer end of one of the bending beams;

three V-shaped flexures with integral top bracket, where each of the V-shaped flexures is attached at a juncture of one of the bending beams and one of the strut extensions and is oriented in a plane perpendicular to the strut extension to which it is attached, and the brackets on the V-shaped flexures are attached to a lower face of the isolator plate and support the isolator plate in a position generally parallel to the base plate and at a prescribed distance from the base plate; and three bidirectional magnetic dampers positioned at equal 120° intervals around the central hub, where each bidirectional magnetic damper is attached to the base plate and to an outer end of one of the strut extensions, and where the bidirectional magnetic dampers collectively provide magnetic damping of all six degrees of freedom of motion of the isolator plate with respect to the base plate.

15. The system of claim 14 wherein each of the bidirectional magnetic dampers includes:

two back iron plates of identical rectangular shape, where the back iron plates are composed of a material with a high magnetic permeability, and where the back iron plates are arranged parallel to each other to define inner faces and outer faces;

eight permanent magnets, where four of the magnets are attached to the inner face of each of the back iron plates in an arrangement with one of the magnets positioned at each corner of each of the back iron plates, and where a fixed air gap exists between the magnets on one back iron plate and the magnets on the other back iron plate; and a conductor plate of a size generally equivalent to the back iron plates, where the conductor plate is oriented parallel to the back iron plates and positioned in the air gap between the magnets, and where the conductor plate is composed of a material with a high electrical conductivity and a low magnetic permeability, whereby an in-plane movement of the conductor plate relative to the back iron plates produces a force on the conductor plate which is a function of and in an opposite direction to a velocity of the movement.

16. The system of claim 15 wherein the back iron plates of each of the bidirectional magnetic dampers are fixed to the base plate, and the conductor plate of each of the bidirectional magnetic dampers is fixed to the outer end of one of the strut extensions, and an innermost of the back iron plates in each of the bidirectional magnetic dampers has a central hole larger than a diameter of the strut extension and through which the strut extension passes.

17. The system of claim 15 further comprising electrical coils affixed to at least one face of the conductor plate, where electrical current can be supplied to the coils to produce a translational force on the conductor plate relative to the back iron plates, whereby the bidirectional magnetic dampers can supply an actuation force and the system can actively position the payload relative to the host platform.

18. The system of claim 15 wherein the permanent magnets are composed of a neodymium-iron-boron alloy, the back iron plates are composed of iron or a magnetic alloy thereof, and the conductor plate is composed of a copper alloy.

19. The system of claim 14 wherein the bending beams, the strut extensions, the V-shaped flexures and the bidirectional magnetic dampers are arranged such that a motion of the payload produces an amplified motion within the bidirectional magnetic dampers, thereby increasing damping effectiveness of the bidirectional magnetic dampers.

20. The system of claim 14 wherein the host platform is a space vehicle operating in a zero-gravity environment.

* * * * *